United States Patent
Viitikka et al.

(10) Patent No.: US 8,388,284 B2
(45) Date of Patent: Mar. 5, 2013

(54) BUNK OF LOAD SPACE

(75) Inventors: Jouni Viitikka, Rhinelander, WI (US);
Stacy Wagler, Rhinelander, WI (US);
Pentii Hukkanen, Kiuruvesi, FL (US)

(73) Assignee: Ponsse Oyj, Vierema (FI)

( * ) Notice: Subject to any disclaimer, the term of this patent is extended or adjusted under 35 U.S.C. 154(b) by 0 days.

(21) Appl. No.: 13/377,883

(22) PCT Filed: Jun. 14, 2010

(86) PCT No.: PCT/FI2010/050496
§ 371 (c)(1),
(2), (4) Date: Dec. 13, 2011

(87) PCT Pub. No.: WO2010/146237
PCT Pub. Date: Dec. 23, 2010

(65) Prior Publication Data
US 2012/0087759 A1 Apr. 12, 2012

(30) Foreign Application Priority Data
Jun. 16, 2009 (FI) .................................. 20095682

(51) Int. Cl.
B60P 7/08 (2006.01)
(52) U.S. Cl. ........................................................ 410/37
(58) Field of Classification Search ............. 410/32,
410/34, 36, 37, 42, 47, 120, 45; 296/43,
296/26.07; 280/143, 145–147, 404; 248/68.1;
211/70.4; 206/443; 105/380, 391, 382, 387
See application file for complete search history.

(56) References Cited

U.S. PATENT DOCUMENTS
6,722,828 B2 *  4/2004  French ........................ 410/37

FOREIGN PATENT DOCUMENTS
| CA | 996585 A1 | 9/1976 |
| DE | 19911872 A1 | 9/2000 |
| DE | 102004002821 A1 | 1/2005 |
| DE | 10351552 A1 | 6/2005 |
| RU | 2162569 C2 | 1/2001 |

OTHER PUBLICATIONS
ISA/FI International Search Report for International Application PCT/FI2010/050496 mailing date Oct. 5, 2010, 4 pages.

* cited by examiner

*Primary Examiner* — Stephen Gordon
(74) *Attorney, Agent, or Firm* — Beem Patent Law Firm

(57) ABSTRACT

The invention relates to a bunk of a load space which bunk (12) includes a frame component (15), a support component (14) articulated to at least one end of the frame component (15), and two bunk arms (16, 17). At least one bunk arm (17) is composed of two or more plates (18, 19, 20) wherein one of the plates (18) is profiled to a curved form (10) on the transverse plane at the position of the load space and the other plate (20) is made parallel to the curved surface of the bunk arm (17) for widening the surface area of the bunk arm (17).

10 Claims, 6 Drawing Sheets

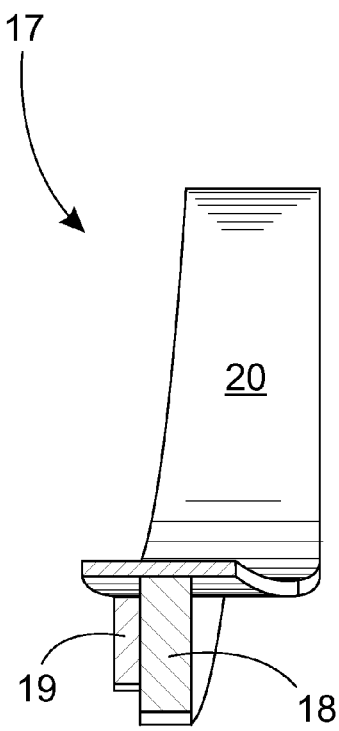
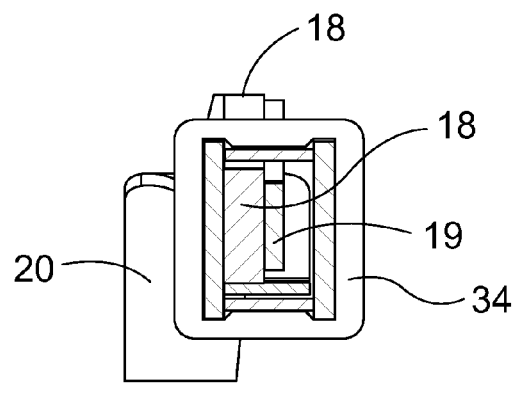
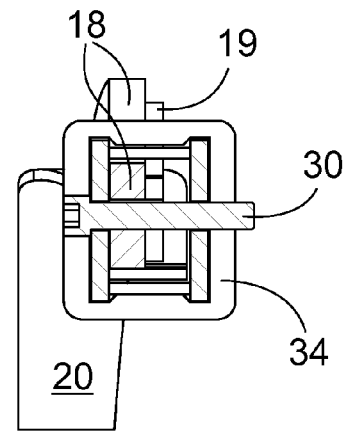
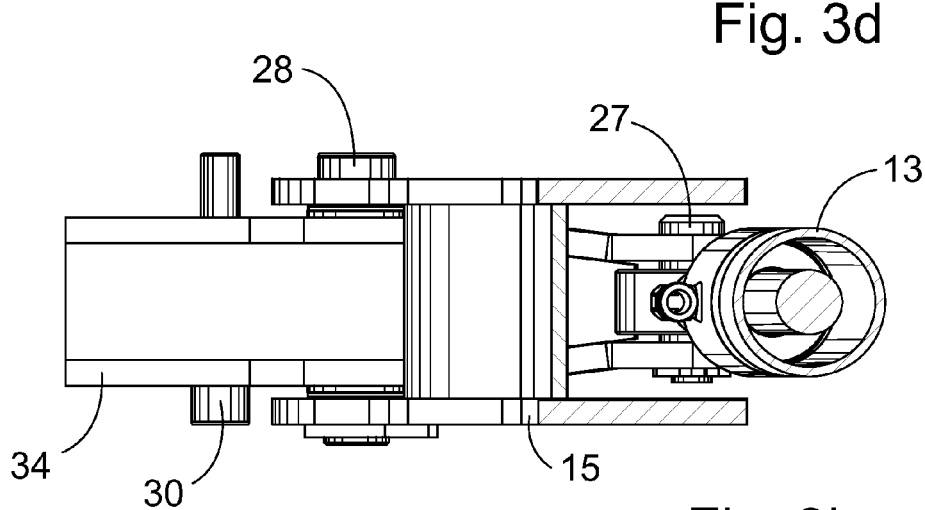

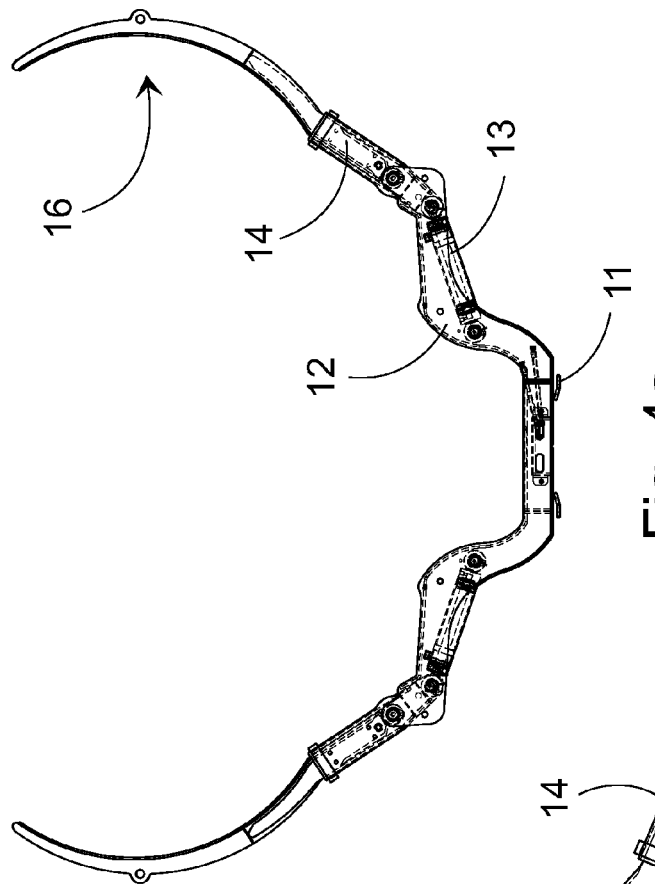
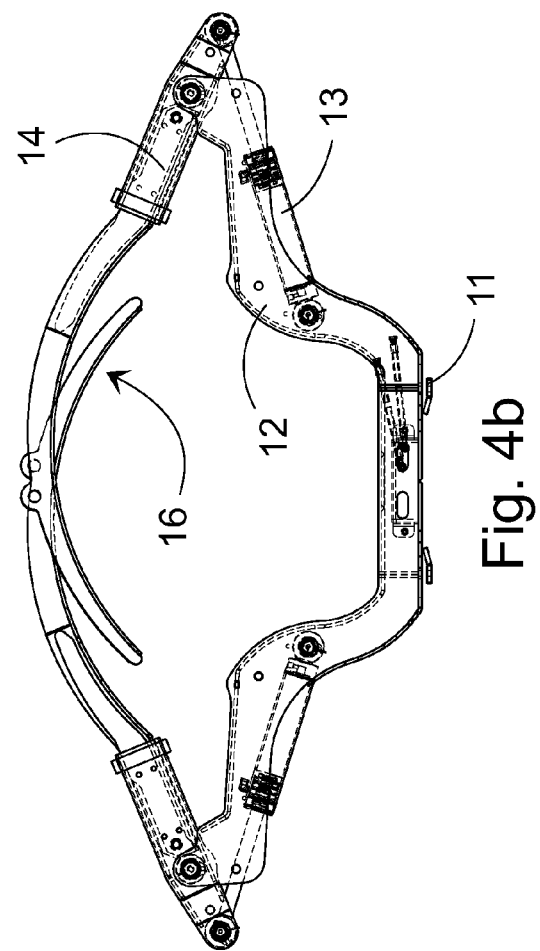
Fig. 4a
Fig. 4b

BUNK OF LOAD SPACE

CROSS-REFERENCE TO RELATED APPLICATIONS

This application is a U.S. national stage application of PCT application PCT/FI2010/050496, filed Jun. 14, 2010, and claims the benefit of priority from Finnish patent application 20095682, filed Jun. 16, 2009.

BACKGROUND OF THE INVENTION

1. Field of the Invention

The invention relates to a bunk of a load space, which bunk includes a frame component, a support component articulated to at least one end of the frame component, and two bunk arms.

2. Description of the Related Art

With increasing use of raw material obtained from forests, the utilization of logging waste and brushwood has also increased, for example, in the energy production. In addition, whole tree is also collected for the purposes of energy production. Forwarding logging waste and brushwood from a logging site is often performed with the same forwarders as are used for transporting saw logs. When transporting saw logs, the load space can be quite open because saw logs can be easily kept aboard in forwarders. However, logging waste and brushwood tend to easily fall from an open load space if it is not supported better than saw logs.

In equipment according to prior art, bunks are often removable and mountable with bolts to the frame of a forwarder. The bunks can also be moved with methods known as such along the frame of a forwarder in the longitudinal direction of the machine as necessary, either manually by loosening or opening the fastening elements, or alternatively, the bunk can be adapted to be movable from the cab, for example, by means of a hydraulic cylinder. Bunks and bunk arms are often fixedly connected to each other by welding. Most commonly, a bunk arm is connected to the bunk with a bolt joint or with some kind of a sleeve, and by mere gravitational force. The construction of the combination of a bunk and a bunk arm can also be bent from one pipe or profile, for example.

Russian patent publication RU 2161569 is known in prior art wherein a logging machine grapple implemented with bunks is proposed. However, this solution is quite demanding and expensive to manufacture because the bunk arms of the bunk are machined as tubular box constructions by welding. The grapple is articulated to the base machine and the grapple is used to haul (skid) a long bunch of trees.

BRIEF SUMMARY OF THE INVENTION

The objective of the invention is to provide a bunk of a load space which bunk is more advantageous for its manufacturing costs and more versatile compared to prior art. The characteristic features of this invention become evident from the following description.

This objective can be achieved with a load space bunk which includes a frame component, support components articulated to both ends of the frame component, and two bunk arms. At least one of the bunk arms is composed of two or more plates wherein one of the plates is profiled to a curved form on the transverse plane at the position of the load space and the other plate is made parallel to the curved surface of the bunk arm for expanding the surface area of the bunk arm. A curved and wide bunk arm remarkably facilitates keeping the logging waste and brushwood in the load space. Advantageously, a third plate is adapted to form reinforcement at the support component end of the bunk arm for strengthening the bunk arm.

According to an embodiment, the curved form of the bunk arm is adapted to change the substantially lateral compression force applied by the bunk arm to the material to be compressed to also have a top-to-bottom vertical direction. In this way, brushwood contained in the load can be pressed against the bottom of the load space to form a compact load. In this context, the term "lateral" refers to the perpendicular direction relative to the articulated shafts of the bunk arms, i.e. the perpendicular direction relative to the longitudinal direction of the saw logs contained in the load space composed of the bunks according to the invention.

The plate of a turning bunk arm may include a mounting hole for locking and lifting the bunk arms. With the mounting hole, the bunk arms can be locked in a closed position such that they cannot open during the transportation.

According to an embodiment, the support component is a boot component to which the bunk arms are adapted to be mounted and removed by quick clamping. This enables quick replacement of bunk arms and good modifiability of the load space to suit different purposes of use. Further, the bunk can include at least one actuator articulated to the support component from one end and to the bunk from the other end for moving the bunk arms between the open and closed positions. The actuator can be a hydraulic cylinder. With the actuator, a load including a lot of empty space can be compacted whereby it keeps well aboard. A compact load enables to utilize the bearing capacity of a forwarder. For its curvature, a plate profiled in a curved form may correspond to 30-90°, advantageously to 45-65°, of the periphery of a corresponding circle.

A load space bunk according to the invention is suitable for use particularly in compacting whole fuel wood, logging waste and other low-density material such that more material than conventionally can be fitted to a load space of a forwarder or similar. In this way, a so-called bearing capacity load is created.

With a load space bunk according to the invention, extremely good modifiability is achieved for the load space for different applications. The bunk enables to use the same load space for transporting both conventional commercial timber, such as saw logs and pulpwood, and logging waste and brushwood, thus increasing the application possibilities of the same forwarder. This also enables to improve the total utilization rate of the forwarder. With the bunk, loadable whole tree can be better compacted, which is important particularly when compressing and transporting whole tree. The bunk arms included in the bunk can be locked for the duration of the transportation such that the load is reliably kept in the load space and cannot fall out. In addition, bunks cannot spread out to the sides when the forwarder is transported on a pallet. Bunk arms are also easy to replace due to the quick clamping devices.

BRIEF DESCRIPTION OF THE SEVERAL VIEWS OF THE DRAWINGS

The invention is described below in detail by making reference to the enclosed drawings which illustrate some of the embodiments of the invention, in which FIGS. 3a-3d illustrate the cut-outs shown in FIG. 2 of a load space bunk according to the invention, FIGS. 4a-4b show a load space bunk according to the invention seen from the end of the load space with the bunk arms in the open and closed positions, FIGS. 5a-5b provide an axonometric view of a load space bunk according to the invention with the bunk arms in the open and closed positions.

DETAILED DESCRIPTION OF THE INVENTION

Figure 1:
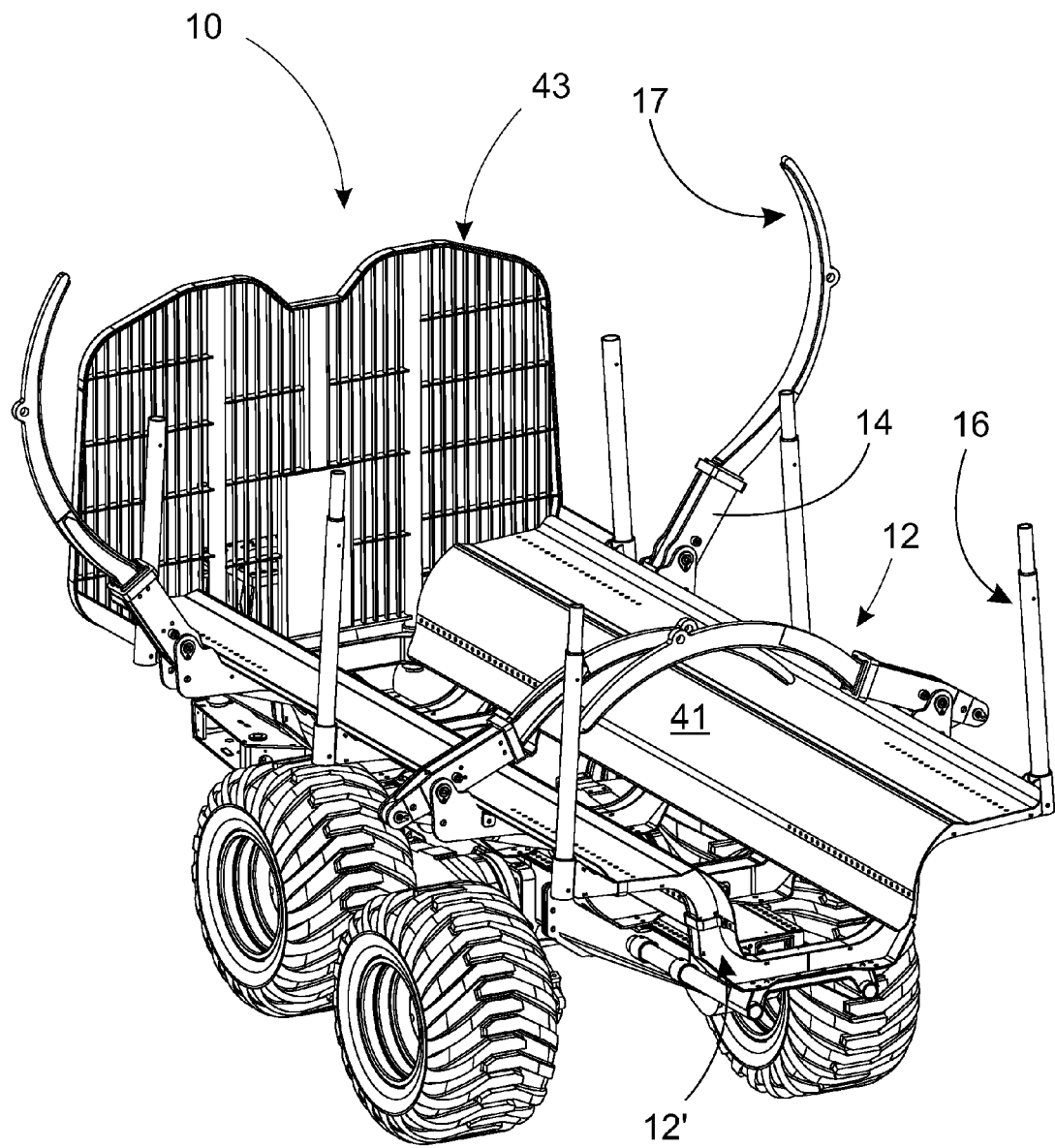
FIG. 1 is an axonometric view of a load space bunk according to the invention, fastened to the rear frame of a forwarder.

FIG. 1 shows the rear frame 42 of a forwarder 40 having two bunks 12 according to an embodiment of the invention and two conventional bunks 12'. The number of bunks 12 and 12' typically ranges from two to four to form a load space 10 together with bunk arms 16 connected thereto. The load space can also include a bottom plate 41 for the load space which plate prevents brushwood from falling out from between the bunks 12 and 12'. The bunks can also be moved with methods known as such along the frame of a forwarder in the longitudinal direction of the machine as necessary, either manually by loosening or opening the fastening elements, or alternatively, the bunk can be adapted to be movable from the cab, for example, by means of a hydraulic cylinder. The bunk according to the invention includes a frame component, a support component articulated to at least one end of the frame component, and two bunk arms.

The frame components according to an embodiment of the bunk according to the invention have curved forms. At the centre, the frame component is adapted to be connected to the frame of a forwarder or a load trailer, and curved parts are provided on both sides of the connection point. After the curved parts, there are additionally horizontal plane portions which are located on a higher level compared to the centre part of the frame component. A curved form avoids interference of large cross-country wheels, which are often used in forwarders, with the frame component of the bunk during the movements of the tandem axle of the forwarder.

A bunk according to the invention may include two types of bunk arms, conventional straight bunk arms 16 and curved bunk arms 17. Bunk arms 17 can be located, as shown in FIG. 1, in every second bunk 12, in which case part of the bunk arms 16 and 17 are conventional fixed bunk arms 16. In FIG. 1, the bunk arms 17 in the bunk 12 that is closest to the end wall 43 of the load space 10 are in the closed position where they usually press the material to be transported against the load space 10. In turn, the bunk arms 17 in the second last bunk 12 are in the open position.

The bunk arms 16 and 17 can be connected to the support components 14 articulated to the bunks 12 with quick clamping devices such that they are easy to remove and install. According to an advantageous embodiment, the support component 14 is more specifically a boot component 34 (in FIG. 2). The bunk arms are connected to the boot component in such a way that the bunk arm comes partially inside the boot component.

In FIGS. 2-6b, reference number 12 refers to a bunk 12 with a box construction. According to an embodiment, boot components 34, which can be turned with an actuator 13, are articulated to both ends of the bunk 12 by means of first links 26. The actuator 13 is advantageously a hydraulic cylinder or other actuator suitable for the application. With the actuator 13, brushwood to be transported can be compacted with the bunk arms 17 of the bunks 12 so that it cannot fall out. The actuator 13 is articulated at one end to the bunk 12 with a second link 27 and at the other end to the boot component 34 with a third link 28. When extending, the actuator pushes the third link whereby the boot component turns around the first link. At the same time, the bunk arms turn between the open and closed positions.

Figure 2:
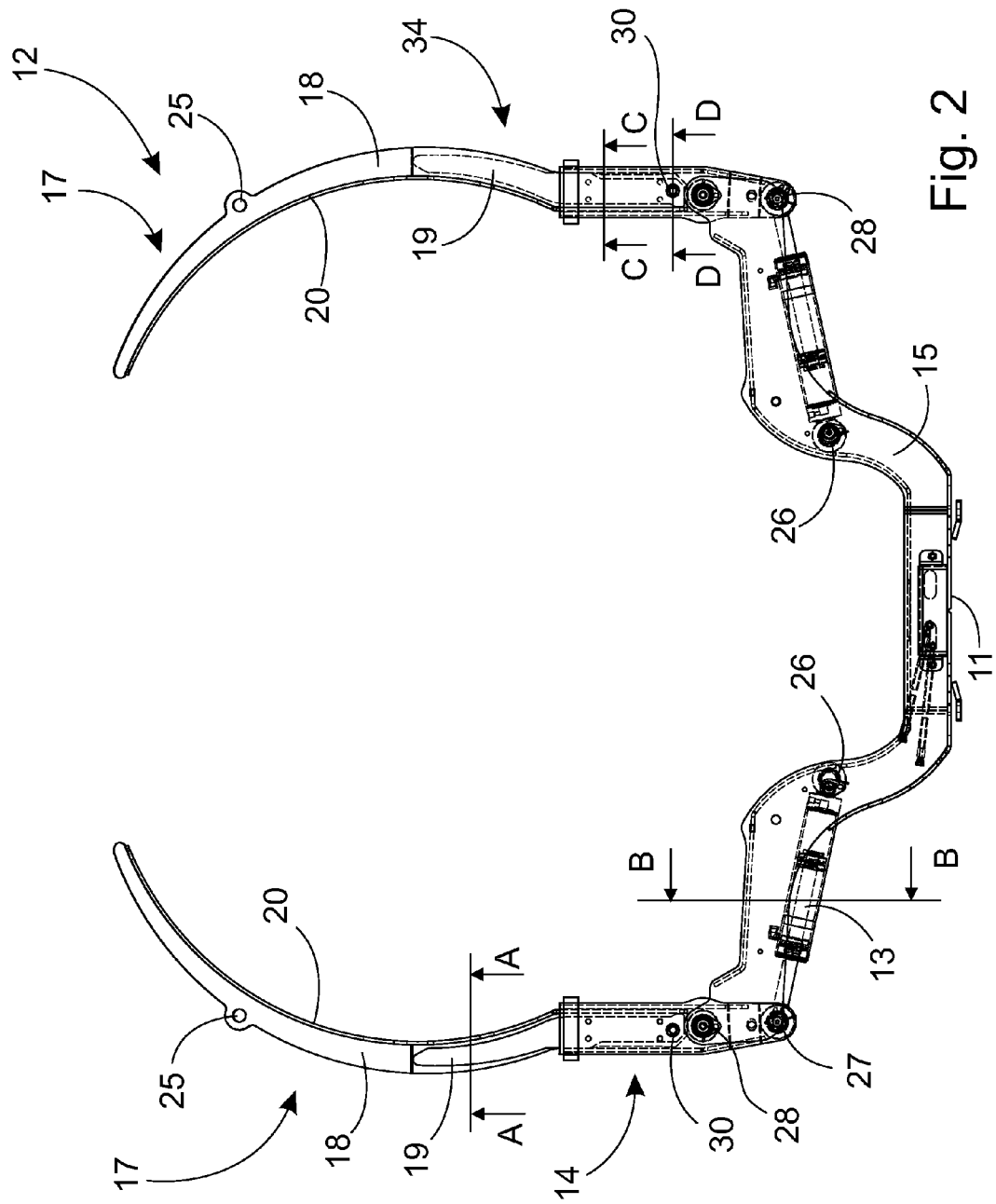
FIG. 2 shows a load space bunk according to the invention, seen from the end of the load space.
Figure 5A:
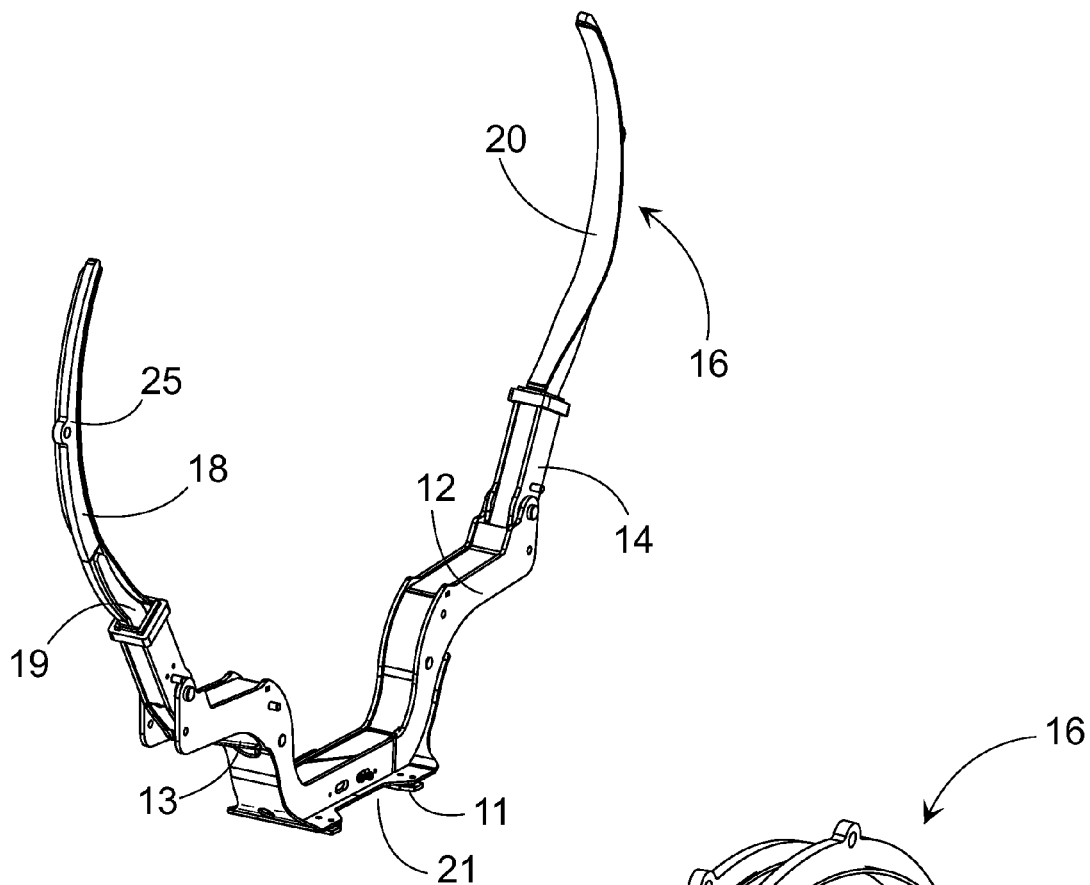
Figure 5B:
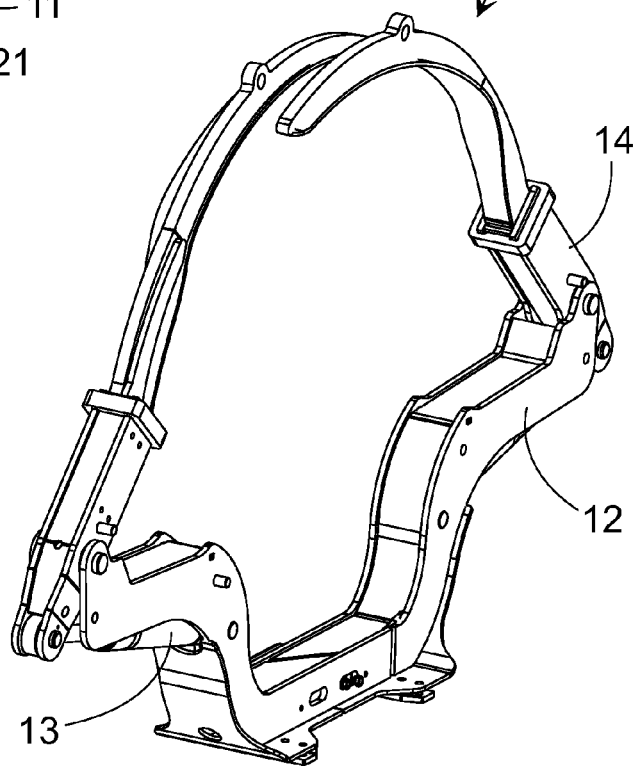

According to FIG. 2, the bunk 12 is provided with amounting plate 11 which forms a slot for the edge of the frame plate of the forwarder. The slot is pressed between the frame 15 and the mounting plate 11. With the mounting plate 11, the bunk 12 can be connected to the frame of the forwarder firmly and reliably.

A forwarder can have 1-4 bunks 12 and 12' according to the figures. These bunks can press whole wood and biomass or other material to a compacter form for saving the load volume. It can be noticed from the shape of the bunk arm 17 that it expands slightly outwards. Particularly the top end of the bunk arm 17 is inwardly curved whereby it increases the downwardly compression force when closing the bunk arms 17. In this context, the term "inwardly" means that the bunk arm 17 curves towards the centre of the load space. The difference in the directions of the end connected to the boot component of the bunk arm and the other end of the bunk arm can be about 60, i.e. the bunk arm 17 curves inwards over its length about as shown in the figures. The curvature of the plate 18 with a curved form of a curved bunk arm 17 can be 30-90°, advantageously 45-65°, of the periphery of a corresponding circle in order that the bunk arm can provide a sufficiently high downward compression force.

According to an advantageous embodiment of the invention, the bunk arm of the bunk is composed of three plate cut-outs, which can be obtained by plasma, laser or water cutting, for example. It can be contemplated that the bunk arm 17 is constructed around the plate 18 wherein a plate 19 is used at the base. The purpose of the plate 19 is to function as a support plate which reinforces that end of the bunk arm 17 which comes to the support component 14. For widening the load bearing surface, a thinner curved plate 20 is used which distributes the compression pressure to a wider area. When pressing with a narrow bunk arm, branches and thinner tree trunks might otherwise break due to the pressing and the bunk arm might sink too deep to the load.

Bunk arms can be manufactured of steel, for example, or other material suitable for the application. The manufacture of bunk arms is simple and economical because bunk arms can be, for example, machined and welded together to form a bunk arm. The length of bunk arms varies according to the application, but generally the length of bunk arms is such that in their closed position they extend crosswise with the bunk arms on the opposite side of the frame component, in which case the load can be properly compressed.

The plate 18 can be provided with a mounting hole 25 which has two purposes. A mounting hole can also be made in a conventional bunk arm. The bunk arms 17 can be easily lifted using the mounting hole 25 and, on the other hand, the bunk arms 17 can be tied together with a pin or wire passed through the mounting hole 25. For safe road transportation, for example, the bunk arms 17 can be locked in the closed position using these holes. Locking serves mainly for the safety of the road transportation in order to avoid that the bunks spread out to the sides when the machine is transported on a pallet.

The bunk arm 16 or 17 which can be a normal straight bunk arm 16 or a bunk arm 17 according to the figure is replaceably installed in a boot component 34. The latter of these bunk arms is extremely useful when loading and transporting, and particularly compacting, biomass. Earlier, a problem with bunk arms according to prior art has been that a so-called "full bearing capacity load" cannot have been made to the load space of a forwarder with logging waste or whole trees with small trunks. When material is compressed with a bunk arm of the bunk according to the invention, this so-called bearing capacity load can be loaded to the load space of the machine.

FIGS. 4a-4b are partly sectional so that the installation of the actuator 13 partly inside the case of the bunk 12 can be clearly seen. Inside the bunk 12 the actuator is protected from the impacts of trees, which improves the durability of the actuator. The figure shows the quick clamping pin 30 of the bunk arms 16, which pin is also visible in the sectional view of FIG. 3d. With the quick clamping pin 30, the bunk arms 16 are locked to the boot components 34.

Bunks according to the invention can also be used in other applications in which bunks are used for transporting and compacting elongated material.

Figures 6A, 6B:
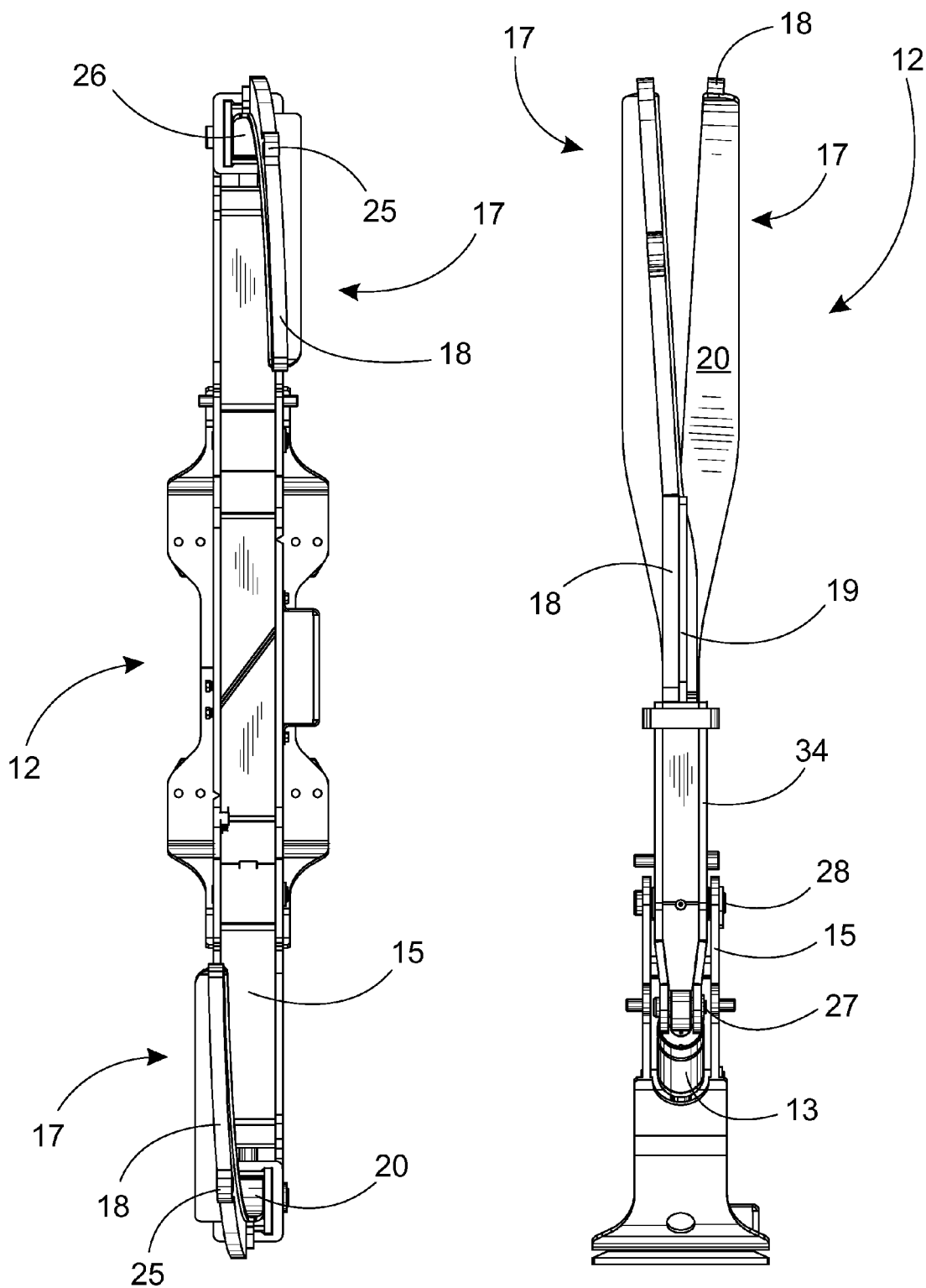
FIGS. 6b-6b show a top view and a lateral view of a load space bunk according to the invention.

According to FIGS. 6a and 6b, the bunk arms 17 can be made so that they overlap each other in the closed position. According to FIG. 6b, the form of the bunk arm 17 can also be slightly laterally tilting, which facilitates overlapping of bunk arms. The manufacture of various bunk arm forms is easy due to the simple basic design of the bunk arm.

The invention claimed is:

1. A bunk of a load space comprising a frame component having two ends, a support component articulated to at least one of said ends of the frame component, and two bunk arms having open and closed positions, wherein at least one of said bunk arms is composed of two or more plates wherein one of the plates is profiled to a curved form on a transverse plane at a position of the load space for changing substantially lateral compression force applied by the bunk arm to material to be compressed and to also comprise a top-to-bottom vertical direction, and another one of said plates is profiled parallel to a curved surface of the curved form of the bunk arm for widening a surface area of the bunk arm, and the bunk comprising at least one actuator for moving the bunk arms between the open and closed positions, wherein the said actuator is articulated at an opposite end of the support component in relation to the bunk arm.

2. A bunk according to claim 1, wherein the third plate is adapted to form a reinforcement at the end of the bunk arm, on the side of the support component, for strengthening the bunk arm.

3. A bunk according to claim 1, wherein one of the plates of each bunk arm comprises a mounting hole for locking and lifting the bunk arms.

4. A bunk according to claim 1, wherein the support component is a boot component to and from which the bunk arms are adapted to be connected and removed with quick clamping.

5. A bunk according to claim 1, wherein said actuator is a hydraulic cylinder.

6. A bunk according to claim 1, wherein a curvature of the plate formed to a curved form corresponds to 30-90° of a periphery of a corresponding circle.

7. A bunk according to claim 2, wherein one of the plates of each bunk arm comprises a mounting hole for locking and lifting the bunk arms.

8. A bunk according to claim 2, wherein the support component is a boot component to and from which the bunk arms are adapted to be connected and removed with quick clamping.

9. A bunk according to claim 3, wherein the support component is a boot component to and from which the bunk arms are adapted to be connected and removed with quick clamping.

10. A bunk according to claim 1, wherein a curvature of the plate profiled to a curved form corresponds to 45-65° of a periphery of a corresponding circle.

* * * * *